United States Patent [19]

Takahashi et al.

[11] Patent Number: 4,988,182

[45] Date of Patent: Jan. 29, 1991

[54] OPHTHALMIC LENSES HAVING A PROGRESSIVELY VARIABLE REFRACTING POWER

[75] Inventors: Fumio Takahashi, Tone; Yasunori Ueno, Kawasaki; Ryuji Aizawa, Tokyo, all of Japan

[73] Assignee: Nikon Corporation, Tokyo, Japan

[21] Appl. No.: 313,470

[22] Filed: Feb. 22, 1989

[30] Foreign Application Priority Data

Feb. 29, 1988 [JP] Japan .................................. 63-47029

[51] Int. Cl.⁵ ................................................ G02C 7/06
[52] U.S. Cl. ............................................................. 351/169
[58] Field of Search ................................. 351/168-172

[56] References Cited

U.S. PATENT DOCUMENTS 4,240,719 12/1980 Guilino et al. ....................... 351/169
4,640,593 2/1987 Shinohara ............................ 351/169

FOREIGN PATENT DOCUMENTS 52-110646 9/1977 Japan .
56-78817 6/1981 Japan .
59-58415 4/1984 Japan .

OTHER PUBLICATIONS

Optica Acta International Journal of Optics, vol. 10, No. 3, 1963, pp. 223-227.

Primary Examiner—Scott J. Sugarman
Attorney, Agent, or Firm—Shapiro and Shapiro

[57] ABSTRACT

An ophthalmic lens having a progressively variable refracting power, includes a portion for distance vision which has a refracting power of a far scene along a principal meridional curve, a portion for near vision which has a refracting power of a near scene, and an intermediate portion defined between the portions for distance vision and near vision to connect these portions by continuously changing refracting power. Changes in curvature $\rho m$ along the principal meridional curve and curvature $\rho s$ along a direction perpendicular thereto are optimized on the principal meridional curve, thereby detecting an optimal shape. The curvature $\rho m$ along the principal meridional curve and the curvature $\rho s$ in a direction perpendicular to the principal meridional curve are maximum in an upper position in the portion for near vision on the principal meridional curve, decreased toward a periphery of the portion for near vision along the principal meridional curve, substantially satisfy condition $\rho m = \rho s$ in an area from at least a lower position in the portion for distance vision to almost the center of the intermediate portion, and satisfy condition $|\rho m - \rho s| \neq 0$ in the area from the center of the intermediate portion to the portion for near vision. The ophthalmic lens has a shape which satisfies the above requirements.

6 Claims, 5 Drawing Sheets

OPHTHALMIC LENSES HAVING A PROGRESSIVELY VARIABLE FOCAL POWER

BACKGROUND OF THE INVENTION:

1. Field of the Invention

The present invention relates to ophthalmic lenses and, more particularly, ophthalmic lenses having a progressively variable refracting power.

2. Related Background Art

Various types of conventional ophthalmic lenses having a progressively variable refracting power are known as auxiliary ophthalmic lenses for correcting an amplitude of accommodation of an eye when accommodation astheney occurs to fail to observe an object near the eye An ophthalmic lens of this type has an upper distance vision correction area (to be referred to as a portion for distance vision hereinafter), a lower near vision correction area (to be referred to as a portion for myopia hereinafter), and a progressively variable refracting power area (to be referred to as an intermediate portion hereinafter) which is defined between the portions for distance vision and near vision and a refracting power of which is continuously changed.

An intersection line between an object-side lens surface and a cross section along a meridian extending substantially perpendicular to substantially the center of a lens surface of the known ophthalmic lens having a progressively variable refracting power is used as a reference line for specifications such as an additional power which represents a difference between the refracting powers of the portions for distance vision and near vision. The reference line is also used as an important reference line in design of these lenses. In the ophthalmic lenses having asymmetrical portions for near vision upon consideration that when a user wears the ophthalmic lenses, the portions for near vision tend to come close to his nose, a vertical central line which passes through the centers of the portions for distance vision and near vision is defined as a reference line. These reference lines are referred to as "principal meridional curves" hereinafter in the present invention.

Conventional ophthalmic lenses having a progressively variable refracting power have a surface shape having a so-called umbilical line in which microscopic spheres continue along the entire principal meridional curve, and a surface shape which is not umbilical, i.e., two principal radii of curvature perpendicular to each other are equal, in part of the principal meridional curve, but in which radii of curvature perpendicular to each other are different in this part of the curve. In other words, surface shapes on the principal meridional curve are classified into two shapes, i.e., a surface shape which is umbilical, i.e., principal radii of curvature perpendicular to each other are equal along the entire principal meridional curve; and a surface shape which is not umbilical on at least part of the principal meridional curve, but in which a radius of curvature along the principal meridional curve is different from that in a direction perpendicular to the principal meridional curve.

In a paper describing the law of Minkwitz as in Optica Acta, Vol. 10, No. 3, 1963, July, at least an intermediate portion of the principal meridional curve must not be umbilical. More specifically, according to the law of Minkwitz, an astigmatic difference in the refracting power on the surface of the lens is twice a change in refracting power on the surface along the umbilical line in a direction perpendicular to the principal meridional curve. Therefore, it is difficult to widen a clear vision area.

An ophthalmic lens having a progressive variable refracting power, which complies with the above law, is disclosed in Japanese Patent Laid-Open (Kokai) No. 52-110646. In this prior-art invention, a predetermined difference is set between two principal radii of curvature perpendicular to each other in an intermediate portion of the principal meridional curve, and the clear vision area in the intermediate portion can be increased.

Japanese Patent Laid-Open (Kokai) No. 56-78817 discloses an arrangement wherein a difference between a curvature pm in the principal meridional curve and a curvature ps in a direction perpendicular thereto is increased from the portion for distance vision to the portion for near vision, and is then decreased in the portion for near vision. In a portion below the portion for near vision, the curvature ρm in the principal meridional direction coincides with the curvature ρs in the direction perpendicular thereto, thereby reducing distortion at the center of the portion for near vision.

An arrangement in which part of the principal meridional curve is not umbilical is disclosed in Japanese Patent Laid-Open (Kokai) No. 59-58415. In an embodiment disclosed in this prior-art invention, a curvature ps is kept constant in an area from the center of the portion for distance vision at the lower end thereof or the center of the portion for near vision at the upper end thereof to a peripheral portion of the lens in a direction perpendicular to the principal meridional curve. A curvature ρm along the principal meridional curve is gradually decreased, thereby widening the clear vision areas of the portions for distance vision and near vision, and at the same time obtaining a compact, lightweight lens.

With the conventional arrangement described above, it is possible to assure the clear vision area to some extent in consideration of the law of Minkwitz. However, the first arrangement disclosed in Japanese Patent Laid-Open (Kokai) No. 52-110646 aims at assuring the clear vision area in the intermediate portion, the second arrangement disclosed in Japanese Patent Laid-Open (Kokai) No. 56-78817 aims at assuring the clear vision area mainly in the portion for near vision, and the third arrangement disclosed in Japanese Patent Laid-Open (Kokai) No. 59-58415 aims at increasing the clear vision areas of both the portions for distance vision and near vision. The first to third arrangements aim at optimizing any of the three areas required for the ophthalmic lenses having a progressively variable refracting power. These three arrangements are not sufficient to increase the clear vision areas in all three areas, i.e., the portions for distance vision and near vision, and the intermediate portion, and improve visual characteristics in all the areas.

In particular, in a conventional ophthalmic lens having a progressively variable refracting power, the line of sight which passes along the intermediate portion of the principal meridional curve is not perpendicular to the lens surface but is inclined with respect to it. If this area is constituted by an umbilical surface, a surface astigmatic difference occurs. In order to satisfy requirements for comfortable field of view in the intermediate portion and reduce lens aberration such as distortion and blurring of the image in the side area of the intermediate portion, the intermediate portion which is an area for changing the refracting power tends to be increased in recent years. In this tendency, a base curve of the front surface of the lens is moderate, and at the same time, an inclination angle between the refracting surface on the principal meridional curve and the line of sight in the intermediate portion is further increased. As a result, an astigmatic difference becomes a serious problem.

SUMMARY OF THE INVENTION:

It is, therefore, an object of the present invention to provide ophthalmic lenses having a progressive variable refracting power, wherein a wide clear vision area is assured in a portion for distance vision, visibility can be improved in an area from an intermediate portion to a portion for near vision aberrational density can be reduced to minimize distortion and blurring of an image in an aberration-concentrated area at each side of the principal meridional curve extending from a lower position in a portion for distance vision to the portion for near vision, and a user who wears these kinds of lenses for the first time can comfortably wear them.

According to the present invention, in ophthalmic lenses having a progressively variable refracting power, comprising a portion for distance vision which has a refracting power of a far scene along a principal meridional curve, a portion for near vision which has a refracting power of a near scene, and an intermediate portion defined between the portions for distance vision and near vision to connect these portions by continuously changing a refracting power, changes in curvature $\rho m$ along the principal meridional curve and curvature $\rho s$ along a direction perpendicular thereto are optimized on the principal meridional curve, thereby detecting an optimal shape.

According to the present invention, the curvature $\rho m$ along the principal meridional curve and the curvature $\rho s$ in a direction perpendicular to the principal meridional curve are maximum in an upper position in the portion for near vision on the principal meridional curve, decreased toward a periphery of the portion for near vision along the principal meridional curve, substantially satisfy condition $\rho m = \rho s$ in an area from at least a lower position in the portion for distance vision to almost the center of the intermediate portion, and satisfy condition $|\rho m - \rho s| \neq 0$ in the area from the center of the intermediate portion to the portion for near vision. The ophthalmic lens has a shape which satisfies the above requirements.

The present invention is based on the following findings. On the principal meridional curve from an upper position in the intermediate portion to almost the center of the intermediate portion, since a distance between this meridional curve portion and an eye point of the portion for distance vision is small, aberration is relatively small. In this range, the lens has good visual characteristics as an umbilical lens surface, and at the same time, a wide clear vision area of the portion for distance vision can be assured. However, in a side area of the intermediate portion, the gradient of the refracting power of the principal meridional curve is generally increased in accordance with an additional power, and therefore lens aberration tends to be concentrated at the center of the lens. In addition, lens aberration occurs up to a lower side area of the portion for distance vision depending upon a specific distribution of the average refracting power of the lens surface, thereby producing components for narrowing the clear vision area of the portion for distance vision. The value of the curvature $\rho m$ along the principal meridional curve and the value of the curvature $\rho s$ in a direction perpendicular thereto are differentiated from each other so that the area from the center of the intermediate portion to the portion for near vision is umbilical along the principal meridional curve in accordance with an additional power.

With the above arrangement according to the present invention, the lens has a surface shape which causes a refractive astigmatic difference gradually increasing from the central area of the intermediate portion in which the refracting power is progressively increased along the principal meridional curve. Therefore, a lens astigmatic difference, and image distortion and blurring in the side area of the intermediate portion can be improved, thereby improving visibility.

Furthermore, the surface shape of the portion for distance vision is preferably given as follows. The curvature $\rho m$ along the principal meridional curve and the curvature $\rho s$ in a direction perpendicular thereto in the portion for distance vision are preferably increased from the center for distance vision which serves as a measuring reference point of the portion for distance vision to an upper position in the portion for distance vision along the principal meridional curve, and are then decreased. With this surface shape, the portion for distance vision and the intermediate portion can smoothly continue in the side area. In addition, the clear vision area of the portion for distance vision can be widened, and the visual characteristics in the side area of the intermediate portion can also be improved.

An average of the surface refracting power on the principal meridional curve is preferably progressively increased from the center for distance vision to an eye point of the portion for distance vision which serves as a reference for fitting lenses into a frame so as to be smoothly connected to an additional power curve of the intermediate portion. Therefore, the portion for distance vision and the intermediate portion can smoothly continue, thereby improving visibility in the intermediate portion.

It is also effective for changes in average refracting power on the principal meridional curve to satisfy the following condition. That is, an increase $\Delta D$ (diopter) of the average refractivity of the surface refracting power in the portion for distance vision from the center for distance vision to an upper position in the portion for distance vision along the principal meridional curve must satisfy the following condition with respect to an additional power A:

$$0-.002A \leq \Delta D \leq 0.2A$$

A gradient Dk (diopter/mm) of the average refracting power curve along the principal meridional curve must satisfy the following condition:

$$0.002A \leq Dk \leq 0.02A$$

Furthermore, an increase AD (diopter) of the average refractivity of the surface refracting power from the center for distance vision to the eye point for distance vision satisfies the following condition with respect to the additional power A:

$$0.03A \leq \Delta D \leq 0.15A$$

a gradient Dk (diopter/mm) of the average refracting power curve along the principal meridional curve must satisfy the following condition.

$$0.003A \leq Dk \leq 0.025A$$

The above and other objects, features, and advantages of the present invention will be apparent from the following detailed description in conjunction with the accompanying drawings.

Figure 1A:
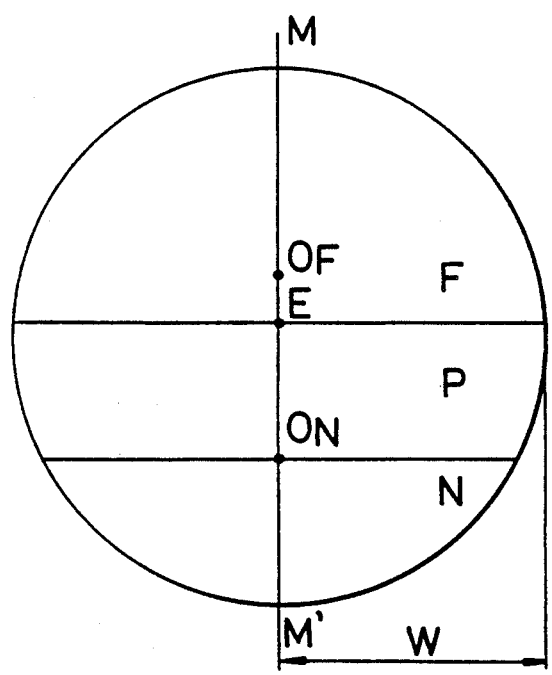
FIG. 1A is a schematic plan view showing areas of an ophthalmic lens having a progressively variable refracting power.
Figure 1B:
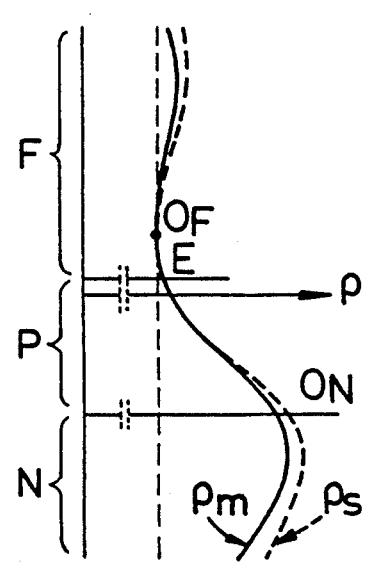
FIG. 1B is a graph showing a change in curvature of a refracting surface along a principal meridional curve MM'.

DESCRIPTION OF THE PREFERRED EMBODIMENTS:

FIG. 1A is a schematic plan view showing areas of an ophthalmic lens having a progressively variable refracting power according to the present invention. FIG. 1B is a graph showing a change in curvature of a refracting surface along a principal meridional curve MM', in which the principal meridional curve which is matched with that in FIG. 1A is plotted along the ordinate, and the curvature p of the refracting surface is plotted along the abscissa.

FIG. 1A is a plan view of an ophthalmic lens having a progressively variable refracting power, a periphery of which is not finished to match with a frame. A circular lens surface consists of an upper portion F for distance vision (i.e., a distance vision correction area) having a refracting power for a far scene (to be referred to be a portion F hereinafter), a portion N for near vision (i.e., a near vision correction area) having a refracting power for a near scene (to be referred to as a portion N hereinafter), and an intermediate portion P (i.e., an area having a progressively variable refracting power) which is defined between the portions F and N and in which a refracting power is continuously changed. These areas are formed along a principal meridional curve MM' which passes along a center OF for distance vision and a center ON for near vision.

As shown in FIG. 1B, a curvature $\rho m$ along the principal meridional curve MM' and a curvature $\rho s$ in a direction perpendicular to the principal meridional curve MM' are minimum on the principal meridional curve MM' near the center OF at a lower position in the portion F, increased downward in the intermediate portion P, maximum at an upper position in the portion N, and decreased toward the periphery of the portion N along the principal meridional curve MM'. In addition, condition $\rho m = \rho s$ is substantially satisfied from at least the lower position in the portion F to almost the center of the intermediate portion P. Condition $|\rho m - \rho s| \neq 0$ is established from almost the center of the intermediate portion P to the periphery of the portion N.

As shown in FIG. 1B, the portion F preferably has a shape to satisfy the following conditions. The curvature $\rho m$ along the principal meridional curve MM' and the curvature $\rho s$ in a direction perpendicular to the principal meridional curve MM' are increased from the center OF to the upper position in the portion for distance vision along the principal meridional curve MM'. The curvatures $\rho m$ and $\rho s$ are then decreased. Therefore, the side area of the portion F and the intermediate portion smoothly continue. The clear vision area of the portion for distance vision can be widened. In addition, the visual characteristics of the side area of the intermediate portion P can also be improved.

Since the ophthalmic lenses having a progressively variable refracting power are worked to match with the size of a frame, the areas of the portions F, P, and N, and particularly, the areas of the portions F and N including the peripheral portions vary depending on the shape of the frame. However, before working of the ophthalmic lens having a progressively variable refracting power, it is a circular lens having a diameter of about 60 mm. The circular lenses are delivered to retail shops and are worked to match with desired frame sizes at the retail shops. Therefore, the surface shape of the ophthalmic lens having a progressively variable refracting power according to the present invention is defined as a shape prior to working. In design of an optimal surface shape of the ophthalmic lens having a progressively variable refracting power, it is important to balance aberration in consideration of the surface shape in a larger area including an effective area to be used in addition to the central area which is frequently used.

The principle of design of the ophthalmic lens having a progressively variable refracting power and each point serving as a reference of the ophthalmic lens having a progressively variable refracting power will be described in detail.

Figure 2:
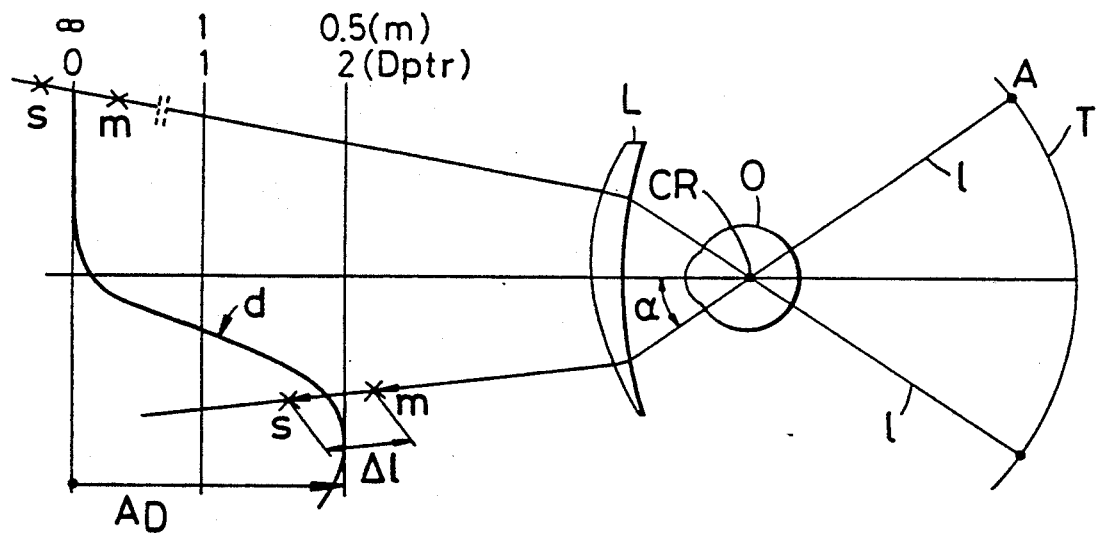
FIG. 2 is a view for explaining the principle of design of the ophthalmic lens having a progressively variable refracting power.

FIG. 2 is a view for explaining a state of an eye when the ophthalmic lens having a progressively variable refracting power is worn. More specifically, FIG. 2 shows a cross section, i.e., cross-section of the lens, along the principal meridional curve MM' shown in FIG. 1A. As shown in FIG. 2, an eyeball 0 is rotated about an eyeball pivot point CR, and a line l of sight passes through various points on the lens. When a user looks at a near object and faces down, the line l of sight is also moved downward by an angle α. In this case, when the user wears ophthalmic lenses L having a progressively variable refracting power as shown in FIG. 1A, the lines of sight of both the eyes are synchronously moved from the portion P to the portion N along the meridional line of the lens. A fovea centralis of a yellow spot of a retina of each eye has the highest visual sense. When the user watches an object, the eyes are directed such that the lines of sight are concentrated on the fovea centralis positions, and clear images must be formed on these positions. An object-side conjugate position obtained when the fovea centralis positions are not accommodated is called an accommodation far point. A track T of this point upon movement of the eyeball is called a far-point spherical surface.

FIG. 2 shows a state of a hypermetropic eye. The accommodation far point of a hypermetropic eye is located behind the eye, so that a far-point spherical surface T about the pivot point can be drawn. Therefore, the accommodation far point is equivalently defined as a position at which the fovea centralis of the yellow spot is located. Assume a light ray 1 which is directed from a point A on the far-point spherical surface toward the lens L through the pivot point CR. In this case, a position at which the light ray 1 refracted by the lens L is converged is given as an object position conjugate with the point A. If an m image (meridional image) formed at the position conjugate with the point A on the far-point spherical surface T along the meridional line coincides with an s image (sagittal image) formed in a direction perpendicular to the meridional line, an in-focus state can be obtained. However, in general, the m image does not coincide with the s image, as shown in FIG. 2, thus causing an astigmatic difference. When the astigmatic difference is large, an object image is seen to be waved or deformed, thus causing an uncomfortable sight.

A curve d shown in the left end of FIG. 2 represents changes in a point conjugate with the far-point spherical surface T and is obtained by connecting average positions between the m and s images The curve d corresponds to a so-called additional power curve of the lens L having a progressively variable refracting power.

Referring to FIG. 2, the refracting power of the portion for distance vision (upper portion) is 0 diopter, the refracting power of the portion for near vision (lower portion) is 2 diopters, and the additional power is 2 diopters. A distance Δ between the m image and the s image corresponds to the astigmatic difference as aberration in a lens wear state.

In this manner, in a state wherein the user actually wears ophthalmic lenses having a progressively variable refracting power, the lens performance is evaluated to perform best design of the ophthalmic lens for best performance in the actual use.

The center OF for distance vision shown in FIGS. 1A and 1B is a position on the principal meridional curve MM' having a predetermined average of the surface refracting powers in the portion F. In practice, the center OF serves as a measuring reference point for the portion F. The center ON is a position on the principal meridional curve MM' having a predetermined average refracting power of the surface refracting powers in the portion N and serves as a measuring reference point for the portion N.

Figure 3:
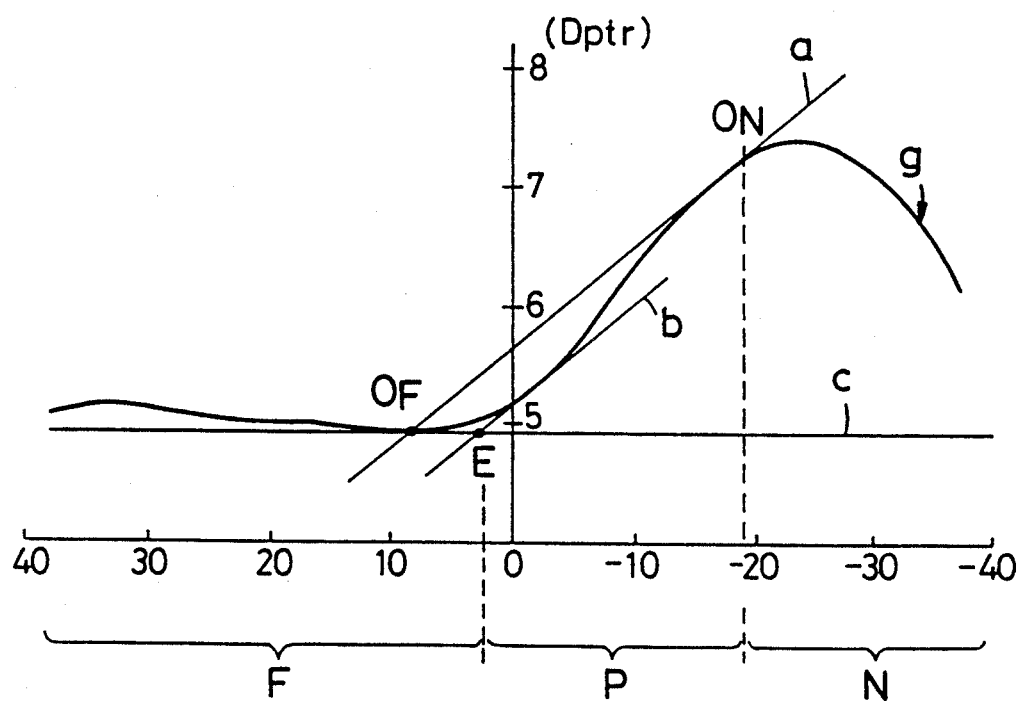
FIG. 3 is a graph for explaining an additional power curve of each major point of the lens having a progressively variable refracting power.

The eye point E for distance vision is a reference position when a lens is fitted in a frame. The eye point E serves as a reference point for distance vision which coincides with a position at which a line of sight for distance vision passes when the user wears the frame. The position of the eye point E for distance vision is determined independently of the center of geometry according to the present invention, as indicated by an average refracting power curve (additional power curve) g on the principal meridional curve, shown in FIG. 3. The position of the eye point E is defined as follows. On the additional power curve g (FIG. 3) obtained by plotting the average of the surface refracting powers on the principal meridional curve at the respective positions on the principal meridional curve, an intersection E between a line c representing an average refracting power on the center OF and a line b which is tangent to the additional power curve g on the side of the portion F and parallel to a line a which connects the center OF for the portion F and the center ON for the portion N is defined as an eye point for distance vision.

Figure 4A:
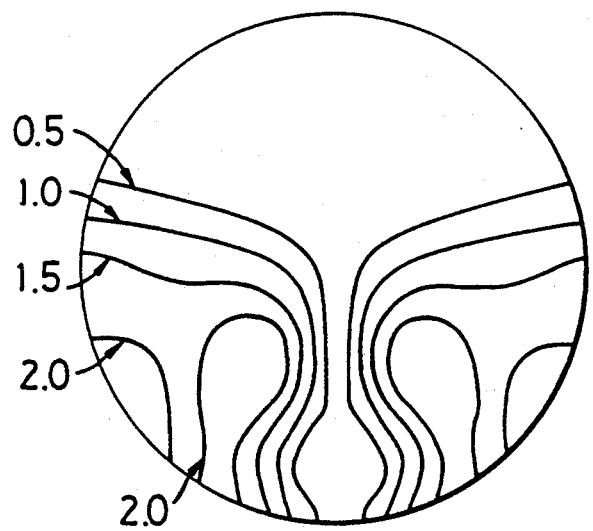
FIG. 4A is an isoastigmatic diagram of an embodiment of the present invention.
Figure 4B:
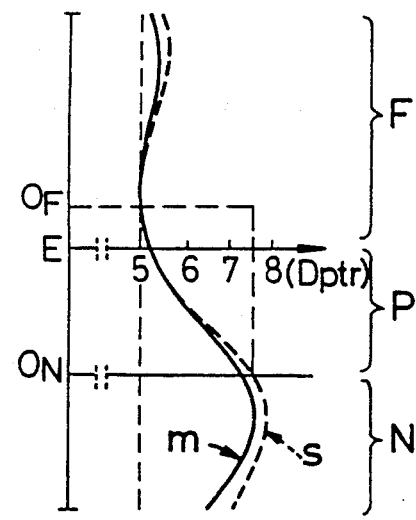
FIG. 4B is a graph showing a refracting power curve on the principal meridional curve of the embodiment shown in FIG. 4A.

FIG. 4A is an isoastigmatic diagram according to an embodiment of the present invention, and FIG. 4B is a refracting power curve on the principal meridional curve in the embodiment of FIG. 4A.

An ophthalmic lens having a progressively variable refracting power according to this embodiment has an average refracting power (base curve) of 5.0 diopters and an additional power of 2.5 diopters. Therefore, as shown in FIG. 4B, the average refracting power is 5.0 diopters at the center OF for distance vision and the average refracting power is 7.5 diopters at the center ON for near vision. The refracting power represented by the refracting power curve m (solid curve) along the principal meridional curve and the refracting power curve s (broken curve) in a direction perpendicular to the principal meridional curve are maximum at an upper position of the portion N on the principal meridional curve. The refracting power of these curves are decreased toward the periphery of the portion N along the principal meridional curve, and coincide with each other from the lower position in the portion F to almost the center of the portion P. The refracting power represented by the curve m along the principal meridional curve is different from that represented by the curve s in the direction perpendicular to the principal meridional curve from almost the center of the intermediate portion P to the portion N. More specifically, the refracting power represented by the curve s in the direction perpendicular to the principal meridional curve is larger than that represented by the curve m along the principal meridional curve.

In this embodiment, the refracting power represented by the curve m in the principal meridional curve and the curve s in the direction perpendicular to the principal meridional curve are progressively increased from the center OF to the upper position in the portion for distance vision along the principal meridional curve, and then decreased. The average of the surface refracting powers on the principal meridional curve is increased from the center OF to the eye point E for distance vision so the curve smoothly continues to the additional power curve of the intermediate portion P.

Changes in average refracting power on the principal meridional curve MM' must effectively satisfy the following condition.

That is, an increase ΔD (diopter) of the average of the surface refracting powers from the center OF to the upper position of the portion for distance vision along the principal meridional curve MM' satisfies the following condition with respect to the additional power A:

$$0.02A \leq \Delta D \leq 0.2A$$

A gradient Dk (diopter/mm) of the average refracting power curve along the principal meridional curve MM' must effectively satisfy the following condition:

$$0.002A \leq Dk \leq 0.02A$$

An increase ΔD of the average of the surface refracting powers from the center OF to the eye point for distance vision must effectively satisfy the following condition with respect to the additional power A:

$$0.3A \leq \Delta D \leq 0.15A$$

A gradient DK (diopter/mm) of the average refracting power curve along the principal meridional curve must effectively satisfy the following condition:

$$0.003A \leq Dk \leq 0.025A$$

More specifically, an increase ΔD (diopter) of the average of the surface refracting powers from the center OF to the upper position in the portion F along the principal meridional curve, and a gradient Dk (diopter/mm) of the average refracting power curve along the principal meridional curve are given with respect to the additional power A=2.5 diopters as follows:
ΔD=0.21 (diopters)
Dk=0.015 (diopters)

An increase ΔD (diopter) of the average of the surface refracting powers and a gradient Dk (diopter/mm) from the center OF to the eye point E along the principal meridional curve are given with respect to the additional power A=2.5 diopters:
ΔD=0.13 (diopters)
Dk=0.02 (diopters/mm)

The performance evaluation of the ophthalmic lenses having a progressively variable refracting power and having the surface shape as described above is performed by the design specifications shown in FIG. 2 when the user wears the lenses, and the result is represented by an isoastigmatic diagram shown in FIG. 4A. In FIG. 4A, isoastigmatic lines are given in units of 0.5 diopter.

Figure 5A:
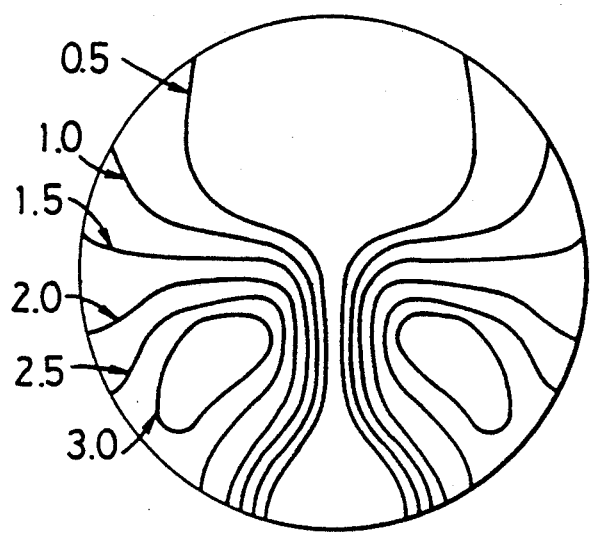
FIG. 5A is an isoastigmatic diagram of a conventional ophthalmic lens having a progressively variable refracting power.
Figure 5B:
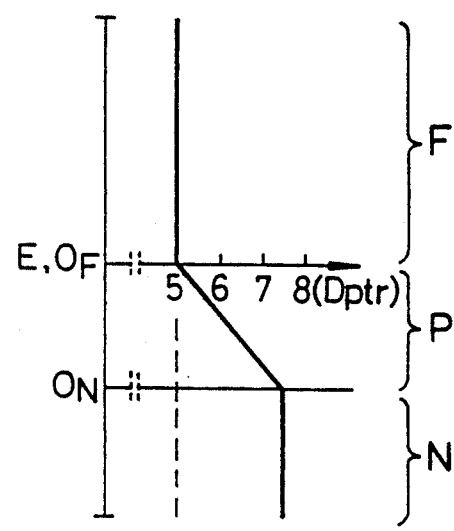
FIG. 5B is a graph showing a refracting power curve on the principal meridional curve of the lens shown in FIG. 5A.

As a comparative reference, an isoastigmatic diagram of the conventional known ophthalmic lenses having a progressively variable refracting power is shown in FIG. 5A, and FIG. 5B shows a refracting power curve. The isoastigmatic lines are plotted in units of 0.5 diopter.

The conventional ophthalmic lens having a progressively variable refracting power, as shown in FIG. 5A, has a higher astigmatic difference density and a larger refracting power gradient due to the following reasons. Start and end points of the refracting power gradient are steep, and the surface refracting powers of the portions F and N on the principal meridional curve are constant. It is difficult to perfectly explain the entire lens surface by only the distribution of the refracting powers on the principal meridional curve. However, when a curved surface on the principal meridional curve in the conventional ophthalmic lens having a progressively variable refracting power is simply extended to the peripheral portion, the aberrational state shown in FIG. 5A cannot be avoided.

According to the present invention, however, the design and gradient of lines representing an astigmatic difference in the side area from the lower position of the portion F to the intermediate portion P are decreased by a moderate refracting power gradient from the center OF to the eye point of the portion F. In addition, by giving a moderate refracting power gradient (i.e., an increase in refracting power) to the upper position in the portion for distance vision, as shown in FIG. 4, the astigmatic difference in the lateral portion of the portion for distance vision can be suppressed.

In the portion N shown in FIG. 4B, a refracting power gradient due to its decrease in the lower position in the portion for near vision can be improved by decreasing the density and gradient of the astigmatic difference in the side area in the portion for near vision. Lens aberration of the lens area including the intermediate portion having a progressively variable refracting power can be suppressed together with an effect by an astigmatic difference ($|\rho m - \rho s| \neq 0$) from the intermediate portion P to almost the center of the portion N on the principal meridional curve.

It is difficult to perfectly explain all surface refracting powers including those in the peripheral portion of the lens by the surface refracting powers on the principal meridional curve. However, a good aberrational balance on the entire lens surface can be obtained and excellent visual characteristics can be maintained by the surface refracting power distribution on the principal meridional curve according to the present invention.

A preferable surface shape in the peripheral portion in the above embodiment will be described on the basis of the surface refracting power distribution on the principal meridional curve.

Figure 6:
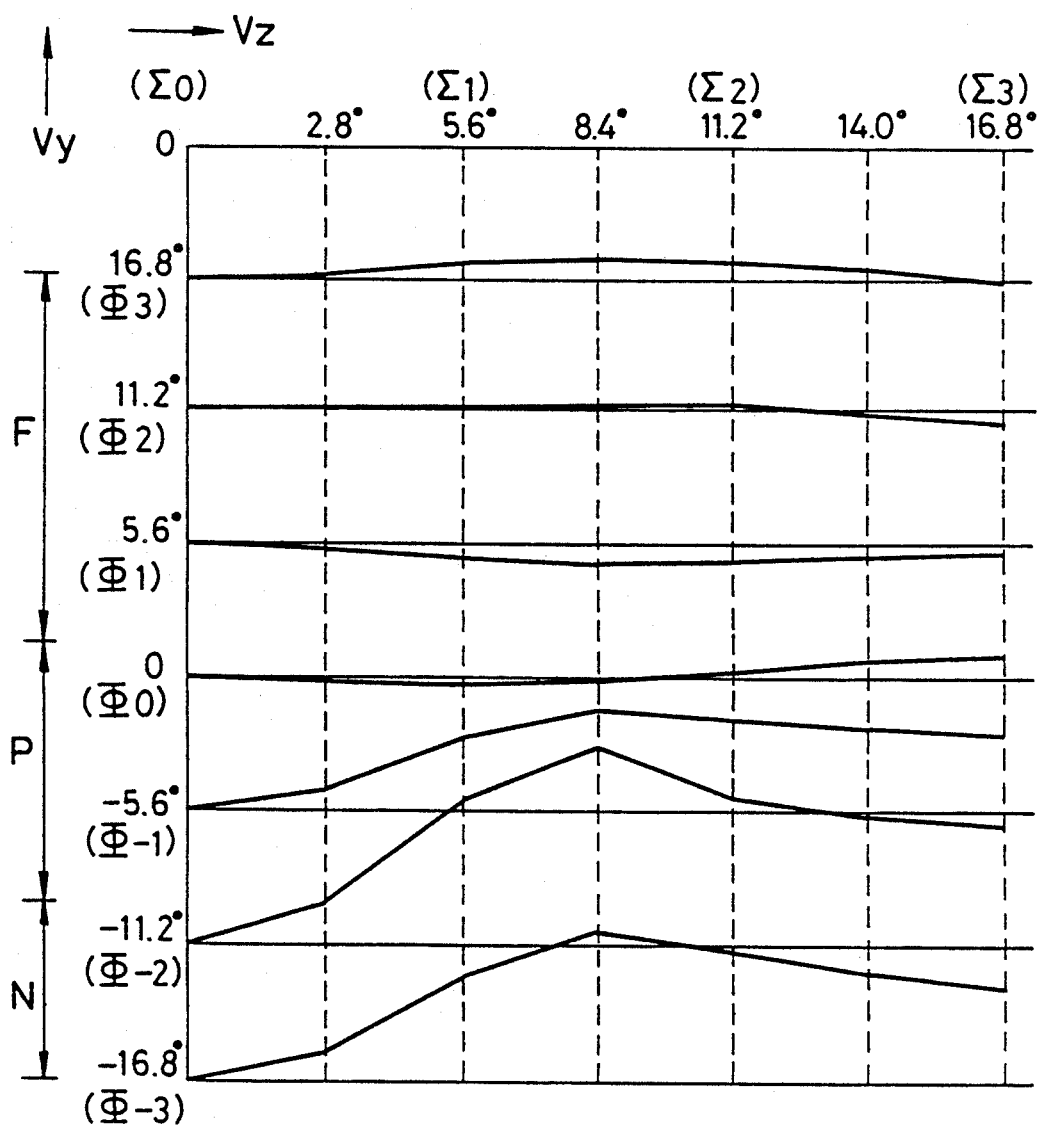
FIG. 6 is a graph showing a cross-sectional shape of a refracting surface of the embodiment of the present invention.

FIG. 6 is a graph showing a cross-sectional shape of a refracting surface of this embodiment. This graph is obtained such that radii of curvature (lateral direction) of seven typical cross-sections intersecting with the principal meridional curve MM' of the right half of the refracting surface with respect to the principal meridional curve as a boundary are plotted with reference to the radii of curvature (lateral direction) on the principal meridional curve MM'.

Figure 7:
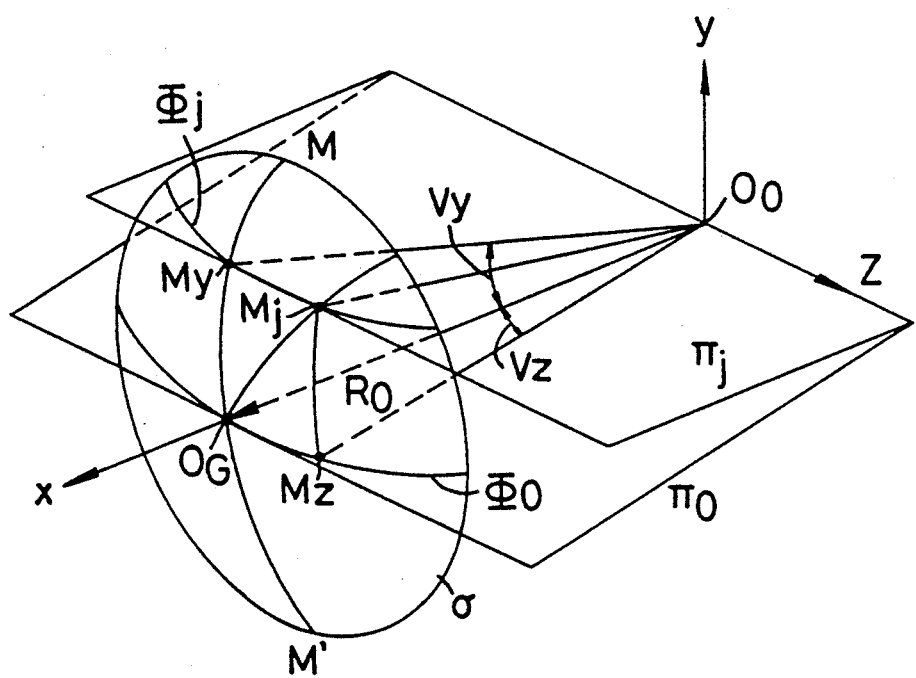
FIG. 7 is a view showing a cross section of an ophthalmic lens having a progressively variable refracting power.

These cross sections are defined as cross sections $\phi_j$ of the refracting surface $\sigma$ constituted by a plane $\pi_j$ perpendicular to a plane passing through the center of a reference sphere and including the principal meridional curve MM', as shown in FIG. 7. In this case, the reference sphere is defined as a sphere having a center $O_G$ of the lens geometry as an optical axis (x-axis), a position of the center of curvature of the refracting surface as a center $O_o$, and a radius $R_o$ of curvature of the refracting surface at the center $O_G$ of the lens geometry as a radius. Therefore, the reference sphere is in contact with the refracting surface $\sigma$ of the lens at the center $O_G$.

According to this embodiment, as shown in FIG. 6, the cross-sectional shape of the refracting surface at a lower position (5.6°) of the portion F is a noncircular curve in which the value of the radius of curvature is decreased when the curve is separated from an intersection with the principal meridional curve MM' and the value is then increased. The cross-sectional shape of the refracting surface at an upper position (16.8°) of the portion F is a substantially circular curve in which the value of the radius of curvature is increased when the curve is separated from the intersection with the principal meridional curve MM' and the value is then decreased. Therefore, this cross-sectional shape has a tendency opposite to that of the lower position in the portion for distance vision. The cross-sectional radius of curvature of the refracting surface is kept almost constant almost at the center (11.2°) of the portion F. In this portion, the cross-sectional shape is constituted by a substantially circular curve.

In the intermediate portion P (−5.6°), the cross-sectional shape of the refracting surface is given as a noncircular curve such that the value of the radius of curvature is increased when the curve is separated from the intersection with the principal meridional curve MM' and is then decreased. A rate of increase and a rate of decrease are increased when the curve comes close to the portion N. This tendency is apparent from comparison with the cross-sectional shape (−11.2°) in the portion N.

In the portion N (−11.2° and −16.8°), the cross-sectional shape of the refracting surface is given as a non-circular curve such that the value of the radius of curvature is increased when the curve is separated from the intersection with the principal meridional curve MM' and the value is then increased. A change position from an increase to a decrease in radius of curvature is about W/2 (where W is the radius of the periphery of the ophthalmic lens having a progressively variable refracting power). In practice, the position preferably falls within the range of W/4 to 3W/4 separated from the principal meridional curve MM' in the lateral direction.

According to the present invention, there are provided ophthalmic lenses having a progressively variable refracting power, wherein a wide clear vision area is assured in the portion for distance vision, the visual characteristics can be improved from the intermediate portion to the portion for near vision, an aberrational density can be reduced in an aberration-concentrated area (an area at each side of the principal meridional curve) from the lower position in the portion for distance vision to the portion for near vision to minimize distortion and blurring, and a user who wears these lenses for the first time can comfortably use them.

What is claimed is:

1. An ophthalmic lens having a progressively variable (refracting) refracting power, including:
    a distance vision correction portion located in an upper portion of the lens along a predetermined principal meridional curve and having a refracting power corresponding to a far scene;
    a near vision correction portion located in a lower portion of the lens and having a refracting power corresponding to a near scene;
    an intermediate portion, defined between said distance vision correction portion and said near vision correction portion, for smoothly connecting the refracting powers of said distance vision and near vision correction portions,
    wherein if a curvature along the principal meridional curve is given as $\rho m$ and a curvature in a direction perpendicular to the principal meridional curve is given as $\rho s$, the curvatures $\rho m$ and $\rho s$ of the refracting surface along the principal meridional curve are substantially equal to each other at least from a lower position of said distance vision correction portion to a substantially center of said intermediate portion and satisfy condition $|\rho m - \rho s| \neq 0$ in the near vision correction portion, and the refracting surface on the principal meridional curve is formed so that the curvatures $\rho m$ and $\rho s$ are set to be maximum in an upper position in said near vision correction portion along the principal meridional curve and decreased toward a periphery of said near vision correction portion on the principal meridional curve.

2. A lens according to claim 1, wherein the distance vision correction portion has a surface shape such that the curvature $\rho m$ along the principal meridional curve and the curvature $\rho s$ in the direction perpendicular to the principal meridional curve are progressively increased from a center of the distance vision correction portion serving as a measuring reference point for the distance vision correction portion to the upper position in said distance vision correction portion.

3. A lens according to claim 2, wherein if an increase of an average of surface refracting powers from the center of the distance vision correction portion to the upper position in the distance vision correction portion along the principal meridional curve is given as $\Delta D$ (diopter) and an additional power is given as A (diopter), the increase $\Delta D$ satisfies the following condition:

$$0.02A \leq \Delta D \leq 0.2A$$

and if a gradient of an average refracting power curve along the principal meridional curve is given as Dk (diopter/mm), the gradient Dk satisfies the following condition:

$$0.002A \leq Kd \leq 0.02A.$$

4. A lens according to claim w, wherein if an increase in an average of surface refracting powers from the center of the distance vision correction portion to a distance vision correction eye point serving as a reference when the lens is fitted in a frame is given as $\Delta D$ (diopter) and an additional power is given as A (diopter), the increase $\Delta D$ satisfies the following conditions:

$$0.03A \leq \Delta D \leq 0.15A$$

and if a gradient of an average refracting power curve along the principal meridional curve is given as Dk (diopter/mm), the gradient Dk satisfies the following condition:

$$0.003A \leq Dk \leq 0.025A.$$

5. A lens according to claim 1, wherein the refracting surface on the principal meridional curve is formed such that an average of surface refracting powers on the principal meridional curve is progressively increased from the center of the distance vision correction portion serving as the measuring reference point for the distance vision correction portion to the distance vision correction eye point serving as the reference for fitting the lens in a frame and is smoothly connected to an additional power curve of said intermediate portion.

6. A lens according to claim 1, wherein the refracting surface on the principal meridional curve is so formed that the values $|\rho m - \rho s|$ is progressively increased from a center of the intermediate portion to the upper portion in said distance vision portion.

* * * * *